United States Patent
Haas et al.

(10) Patent No.: US 7,754,268 B2
(45) Date of Patent: Jul. 13, 2010

(54) USE OF ERYTHRITOL AND/OR XYLITOL IN BAKING MIXTURES OR DOUGHS FOR NON-PERISHABLE GOODS MADE FROM FLOURS AND/OR STARCHES AS PARTIAL OR COMPLETE SUGAR REPLACEMENT

(75) Inventors: Franz Haas, Vienna (AT); Johann Haas, Klosterneuburg (AT); Karl Tiefenbacher, Vienna (AT)

(73) Assignee: Franz Haas Waffelmaschinen - Industrie AG, Vienna (AT)

( * ) Notice: Subject to any disclaimer, the term of this patent is extended or adjusted under 35 U.S.C. 154(b) by 261 days.

(21) Appl. No.: 09/768,394

(22) Filed: Jan. 24, 2001

(65) Prior Publication Data

US 2002/0150663 A1 Oct. 17, 2002

Related U.S. Application Data

(63) Continuation of application No. PCT/AT99/00186, filed on Jul. 26, 1999.

(30) Foreign Application Priority Data

Jul. 24, 1998 (AT) ..................... 1280/98

(51) Int. Cl.
*A23L 1/236* (2006.01)
*A21D 10/00* (2006.01)
(52) U.S. Cl. .............. 426/548; 426/523; 426/549; 426/555; 426/661
(58) Field of Classification Search ............. 426/548, 426/549, 520, 523, 555, 658, 661
See application file for complete search history.

(56) References Cited

U.S. PATENT DOCUMENTS

| 4,283,430 A | 8/1981 | Doster et al. |
| 4,303,690 A | 12/1981 | Haas, Sr. et al. |
| 4,442,132 A * | 4/1984 | Kim ..................... 426/549 |
| 5,059,432 A * | 10/1991 | Berkowitz et al. ........... 426/19 |
| 5,533,439 A | 7/1996 | Ito |
| 5,876,772 A | 3/1999 | Biggs et al. |

FOREIGN PATENT DOCUMENTS

| AT | 344 633 | 8/1978 |
| DE | 25 08 533 | 8/1975 |
| DE | 42 39 143 A1 | 1/1994 |
| DE | 195 39 177 A1 | 5/1996 |
| DE | 197 37 180 A1 | 3/1998 |
| EP | 0 012 588 B1 | 6/1980 |
| EP | 0 511 761 A1 | 11/1992 |
| EP | 0 688 502 A1 | 12/1995 |
| EP | 0 753 262 A2 | 1/1997 |
| JP | 1-312960 | * 12/1989 |
| JP | 5-103619 | * 4/1993 |
| JP | 10-155410 | * 6/1998 |
| WO | 95/08268 | 3/1995 |

* cited by examiner

*Primary Examiner*—Leslie Wong
(74) *Attorney, Agent, or Firm*—Laurence A. Greenberg; Werner H. Stemer; Ralph E. Locher

(57) ABSTRACT

The invention proposes replacing the sugar partially or completely by erythritol and/or xylitol in baking mixtures or doughs for non-perishable baked goods made from flours and/or starches, which baked goods are deformed after the baking step in the still plastic state or in the state which has become plastic again by reheating, for example by wrapping, rolling, pressing, stamping, embossing, bending, folding or deep-drawing, the content of erythritol and/or xylitol when the sugar is completely replaced being from 12 to 55% by weight, in particular from 13 to 50% by weight, based on flour and/or starch.

21 Claims, No Drawings

USE OF ERYTHRITOL AND/OR XYLITOL IN BAKING MIXTURES OR DOUGHS FOR NON-PERISHABLE GOODS MADE FROM FLOURS AND/OR STARCHES AS PARTIAL OR COMPLETE SUGAR REPLACEMENT

CROSS-REFERENCE TO RELATED APPLICATION

This application is a continuation of copending International Application No. PCT/AT99/00186, filed Jul. 26, 1999, which designated the United States.

BACKGROUND OF THE INVENTION

Field of the Invention

The production of wafers which have been substantially baked dry and are therefore crispy and brittle (flat wafers, hollow wafers, cones and cups, wafer biscuits, rolled wafers, fantasy shapes etc.) or other non-perishable goods, for instance wafer rolls, is performed by methods which have long been known in which a flowable baking mixture, also including viscous to solid dough, is baked using heated baking molds within a very short time of less than 1 to 3 minutes to a residual water content so low that the known brittle texture results.

Physically this means that these products are then below their glass transition point. This glass transition point is essentially determined by the high-molecular-weight constituents such as starch and protein, which are always hard and brittle at room temperature and water contents below approximately 5% by weight.

However, by increasing the water content, even at room temperature, the glass transition point is then reached and exceeded. In this case the known phenomenon of the waffles becoming tough occurs and as the process proceeds, at water contents in the range from about 10 to 20% by weight, the waffles become soft. Water is therefore here a highly efficient plasticizer. However, still higher water contents then lead, from a water content of approximately 22-25% by weight, to a complete collapse of the porous wafer structure, combined with deformation and shrinkage. It is known, for instance, for an ice-cream cone to become softened or for holes to be formed in wafers by water droplets.

Breakage-free deformation of wafers at room temperature is therefore only possible if, due to a moderate and gentle moisture absorption, the region of approximately from 10 to 20% by weight of water content is achieved. After a deformation, by drying, the crispy and brittle state can be achieved again and thus the new shape can be fixed.

A method which involves easier handling and is therefore more frequently used of producing wafers and wafer-like thin-walled fine baked goods and non-perishable baked goods which can still be reshaped after the baking step, for example by wrapping, rolling, pressing, stamping, embossing, bending, folding or deep-drawing, is the inclusion of high sugar proportions in the formula of the baking mixtures and doughs, a process which has long been known.

Here, the simple process of baking a flat wafer piece is combined with the possibility of plasticizing this at the baking temperature or just below by the molten sugar components and thus still being able to reshape it easily mechanically, but then by simple and rapid cooling to solidify the sugar, thus stabilizing the shape obtained. A brittle, hard product is also obtained, and these wafers which also essentially consist of a starch/sugar/protein mixture are below the glass transition point at room temperature. The sugar content is, moreover, generally solidified as a glassy melt and is therefore particularly crispy in texture.

The currently most widespread sugar-containing wafers reshaped in this manner are rolled ice-cream cones and wafer rolls (rolled wafers). The former frequently have sugar contents (sucrose and other sugars) of generally from 30 to 50% by weight, based on flour, but wafer rolls, in contrast, in the range from 60% by weight to greater than 100% by weight.

Some figures for sugar contents, based on flour, from the patent literature are given below for such products:

| | |
|---|---|
| AT 344633 | greater than 30% by weight, preferably 40-60% by weight. |
| EP 12588 B1 | 25-60% by weight, preferably 35-45% by weight. |
| US 4283430 | 75-400% by weight. |
| DE 4239143 A1 | 40% by weight. |
| DE 19539177 A1 | 40% by weight. |
| WO 95/08268 | greater than 30% by weight. |

Such sugar-containing baked goods also become tough or soft, due to moisture absorption and the associated plasticization by water, in an analogous manner to reshapeable products described above not in the hot state.

As disclosed by DE 19737180 A1, with a sufficient sugar content, by reheating the wafers to preferably from 130° C. to 150° C., deformability can be reachieved. The exemplary embodiments used there show a sugar content (sucrose, syrup and invert sugar) of about 60% by weight, calculated on flour.

All these sugar-containing hot-reshapeable wafers are available on the market in a multiplicity of sweet-tasting confectionery goods, combined with ice-cream, chocolate, confectionery creme fillings, glazes and decorations etc. In these combinations, the technological necessity of using considerable sugar contents in the formula poses no problems.

According to Röper and Goossens (Starch/Stärke 45, 400 ff., 1993), applications of erythritol are to be foreseen, inter alia, in sweeteners, chocolates, sweets, confectionery cremes and cakes, more precisely for producing low-energy standard foods, and also dietetic products, for instance for diabetics and the obese.

In the more recent patent literature, for example, in EP 511761 B1, EP 688502 A1 and EP 753262 A2, applications of erythritol are found in instant fillings, confectionery cremes or coatings for flans and other baked goods.

The reference Patent Abstracts of Japan, Vol. 1998, No. 11 & JP-A-10155410 further discloses adding a sparely soluble sugar alcohol or sugar to the baking mixture for producing wafers which detach easily from molds, do not form burnt residues and do not deform on removal. An example of such a sugar alcohol cited is erythritol.

If the highest erythritol content specified in this reference is calculated as "percentage by weight, based on the flour component", this gives a maximum content of 10.4% by weight.

Apart from the fact that the object according to the reference in question is fundamentally different from that according to the invention, the highest value for the erythritol content is also significantly below the lower limiting value according to the present invention.

However, in addition, there has long been an increasing requirement for reshaped products of this type which do not taste sweet, for instance as spicy snack items with or without fillings with non-sweet tastes, for instance having cheese, fish or meat flavors. In this case, reshaped wafers, as containers or carriers of texture and flavor, could in many cases make their contribution to a successful combination of crispy-hard wafers/soft filling.

There has therefore been no lack of attempts to achieve this. The patent literature and products presented on the market show two principal paths to a solution which are taken by those skilled in the art.

1. The attempt to "mask" the sweet taste, for instance by salt, strong spices, various seasoning sauces and other seasonings and the taste enhancers usual in the non-sweet sector, for instance glutamates and inosinates.

2. The use of other sugars (monosaccharides, disaccharides) having a lower sweetness intensity than sucrose, for instance lactose, glucose, maltose, lower maltodextrins etc. and in addition the intensive use of seasonings. In the patent AT 357131 there is, for instance, such a suggestion in which approximately 47% by weight of glucose syrup, calculated on the flour and/or starches used, and copious salt and spices are used for producing sugar-free rolled wafers.

In both cases, experience has shown a plurality of problems which to date have not permitted success of such products:

a) the mixed taste impression occurring does not permit products with high sensory quality. The sweetness present is noticeable. The resultant taste is either rejected or quickly leads to oversaturation.

b) The sugars used instead of sucrose are either still relatively sweet themselves, for example glucose with approximately 85% by weight of the sweetness intensity of sucrose, or higher concentrations must be used in order to achieve the same effect in plasticization, as is the case with maltose, lactose, and lower maltodextrins.

c) The restricted solubility can also limit substitution, for example in the case of lactose.

SUMMARY OF THE INVENTION

It is accordingly an object of the invention to provide a baking mixture such as batter or dough for baking heat-deformable non-perishable baked goods characterized by a diminished level of sweet taste made from flours and/or starches, that overcomes the above-mentioned disadvantages of the prior art methods and mixtures of this general type.

It is a further object of the invention to provide non-perishable baked goods made from flours and/or starches, shaped in a plastic state at an elevated temperature and characterized by a diminished level of sweet taste and a crispy and brittle texture at ambient temperature, that overcomes the above-mentioned disadvantages of the prior art methods and mixtures of this general type.

It is a further object of the invention to provide a method of producing non-perishable baked goods made from flours and/or starches, shaped in a plastic state at an elevated temperature and characterized by a diminished level of sweet taste and a crispy and brittle texture at ambient temperature that overcomes the above-mentioned disadvantages of the prior art methods and mixtures of this general type.

With the foregoing and other objects in view, surprisingly, it has now been found in accordance with this invention that polyols having four to five carbon atoms and an alcoholic hydroxyl group linked to each carbon atom, in particular erythritol, xylitol, and mixtures thereof, are extremely efficient plasticizers for heat-deformable baked goods having a crispy and brittle texture at ambient temperature. Accordingly, the proportion of the functional plasticizer "sugar(s)" in wafers which can be reshaped in the still hot state or in the state in which they are replasticized by reheating can be partially or completely replaced, and also significantly reduced, frequently to less than 50% by weight, by using an effective plasticizing amount of at least one polyol having four to five carbon atoms and an alcoholic hydroxyl group on each carbon atom, in particular erythritol, xylitol, and mixtures thereof.

When partially replacing sugar, the effective plasticizing amount of the polyol is at least 1% by weight of the total quantity of flours and starches and can range up to about 60% by weight of the total quantity of flours and starches. Preferably, the effective plasticizing amount of the polyol is 1 part by weight for each 2-3 parts by weight of sugar being replaced. Hence the quantity of sugar remaining when sugar is partially replaced by polyol according to the invention can range up to 67% by weight of the total quantity of flours and starches.

When entirely replacing sugar, the effective plasticizing amount of the polyol according to the invention is in the range from 12% to 55% by weight of the total quantity of flours and starches, preferably from 13 to 50% by weight on the same basis.

This is all the more remarkable, since corresponding experiments with another polyol, glycerol, which has three carbon atoms and three alcoholic hydroxyl groups, is known as an efficient plasticizer in the field of producing thermoplastic starches and is therefore obvious, were not successful here. Using glycerol, a similar wafer piece cannot be obtained. Only relatively thin wafers can be baked at all, with, moreover, bubble formation and the occurrence of light spots in the product and a significant tendency to sticking being observed.

In addition, it is all the more surprising, since, for instance, sorbitol, a polyol having six carbon atoms and six hydroxyl groups, cannot be used as a sugar substitute in such baked goods since it does not show this strong plasticizing action.

Throughout the disclosure and claims of the invention, "sugar" is defined to mean all sugars previously used in wafer production, such as sucrose, other sugars (i.e. monosaccharides and disaccharides), and the sugar components of syrups such as starch syrups, glucose syrups, fructose syrups, molasses syrups, as well as invert sugar and honey.

Throughout the disclosure and claims of the invention, percent levels of ingredients are calculated as parts by weight of the ingredient per 100 parts of flours and starches combined.

Erythritol, 1,2,3,4-tetrahydroxybutane, melting range 120° C.-126° C., is a white crystalline powder, readily soluble in water. Its occurrence in fruits, mushrooms and yeasts is known. Erythritol is currently preferably produced by fermentation from starch. Erythritol, compared with sucrose, has an only moderate sweet taste, approximately 65% by weight sweetness intensity as 10% strength by weight solution, and even less in the solid state as in non-perishable baked goods. The highly negative heat of solution causes a pleasantly cool taste impression in the mouth.

Erythritol has already been permitted as a food in Japan, and in other countries this is to be expected. This polyol has only a low utilizable energy content for humans, about 10% by weight compared with sucrose. Erythritol is suitable for diabetics, is noncariogenic, is nonhygroscopic and has virtually no laxative effect.

Xylitol, 1,2,3,4,5-pentahydroxypentane, CAS 87-99-0, melting range 92° C.-96° C., is a white crystalline powder, readily soluble in water. It is found in fruits and vegetables. Xylitol tastes sweet, with a similar intensity to sucrose, and due to its highly negative heat of solution, causes a pleasantly cool taste impression in the mouth.

Xylitol is generally permitted as a sweetener in foods, and no ADI value is specified for limiting the acceptable daily intake. Only for higher concentrations must a warning be declared against potentially laxative effect. In addition, xylitol has noncariogenic effect and anticariogenic effect and is therefore currently widely used in sugar-free sweets and chewing gums.

Accordingly, there is provided according to this invention, a baking mixture for baking non-perishable baked goods made from flours and/or starches, which are deformable at an elevated temperature and are characterized by a brittle and crispy texture at room temperature and a diminished level of sweetness, comprising, in weight percent of the total quantity of flour and starch, 70-150% of water, 0-67% of a sugar, and an effective plasticizing amount of at least one aliphatic polyol having four to five carbon atoms and an alcoholic hydroxyl group linked to each carbon atom.

Also in accordance with this invention, there are provided non-perishable baked goods made from flours and/or starches, which are deformable at an elevated temperature and characterized by a brittle and crispy texture at room temperature and a diminished level of sweetness, comprising, in weight percent of the quantity of flour or starch, whichever is greater:

Maximum 10% of water, preferably less than 3%;

0-67% of a sugar, and an effective plasticizing amount of at least one aliphatic polyol having four to five carbon atoms and an alcoholic hydroxyl group linked to each carbon atom.

There is also provided, in accordance with this invention, a method of producing non-perishable baked goods made from flours and/or starches, which are deformable at an elevated temperature and characterized by a brittle and crispy texture at room temperature and a diminished level of sweetness, comprising the steps of:

mixing water with aliphatic polyol having four to five carbon atoms and an alcoholic hydroxyl group on each carbon atom, sugar and other minor components (for example salt, baking powder, emulsifiers, fat, nutrient supplements, . . . ) when present, and flour and/or starch, thus affording a baking mixture;

metering the baking mixture into a heated baking vessel and baking to a residual water content of a few percent by weight, preferably less than 3% by weight. The baking temperature is in the range from 140° C. to 230° C. and the baking time, depending on product and baking temperature, is generally between 40 seconds and 3 minutes;

removing the hot baked product from the baking vessel and while still hot or when reheated after an intervening cooling stage, shaping the product by wrapping, rolling, deep-drawing, pressing, embossing, stamping, bending, or folding; and fixing the shape by cooling to solidify the plasticizing polyol and sugar when present.

The surprisingly strong plasticizing action of erythritol and/or xylitol, in the case of complete replacement of sugar(s), is accompanied by a reduction in the required amount used to about half to one third of the sugar otherwise required.

The highly efficient plasticizing action of the polyols according to the invention can be used for complete or partial replacement of sucrose and other sugars such that 1 part by weight of polyol can replace at least 2 and up to 3 parts by weight of sugar. Below approximately 0.5% by weight of polyol (calculated on the sum of flours and starches), its use is of little expedience, since at this level only approximately from 1 to 1.5% by weight of sugar can be replaced. Meaningful benefits of replacing sugar by polyol according to the invention are observed at polyol levels of 1% by weight of polyol (based on the total of flour and starch) replacing 2-3% of sugar. The upper concentration of polyol according to the invention, in many applications, for instance rolling of cones, rolled wafers or wafer rolls is limited to an extent which is generally below the ranges now common for sugar (see the exemplary embodiments). For other deformation processes, for instance deep-drawing such flour/starch-based edible products, however, even higher concentrations can be used.

For complete sugar replacement, according to the invention the proportion of erythritol and/or xylitol, based on flour and/or starch, is from 12 to 55% by weight, preferably from 13 to 50% by weight.

This proportion, in baking mixtures such as batters or doughs, which are destined for the production of wafer rolls is from 20 to 55% by weight, preferably from 22 to 55% by weight, in particular from 25 to 50% by weight, which are destined for the production of rolled wafer cones is from 12 to 30% by weight, preferably from 13 to 25% by weight, which are destined for the production of rolled wafers is from 12 to 55% by weight, preferably from 14 to 35% by weight, in particular from 15 to 30% by weight, which are destined for the production of deep-drawn shaped bodies is from 15 to 55% by weight, preferably from 16 to 40% by weight, in particular from 18 to 35% by weight.

The production of reshapeable wafers or wafer rolls from sugar-containing baking mixtures is known technology using the following underlying data, which is also used in reshapeable products produced with partial or complete replacement by erythritol and/or xylitol.

Main Raw Materials:

Water, flour and/or starches and sugar are the main raw materials. In addition to, or instead of, wheat flour, other flours and/or starches can also be used.

In addition to, or instead of, sucrose, other sugars (monosaccharides, disaccharides) and components of syrups (starch syrups, glucose syrups, fructose syrups, molasses syrups, invert sugar, honey) can also be used in conjunction.

Mixing:

Sugar, sugars and syrups and other minor components (for example salt, baking powder, emulsifiers, fat, nutrient supplements, . . . ) are firstly dissolved or dispersed in water. The flour is then added and the whole is prepared to form a homogeneous suspension of flour in a solution of the sugar(s).

Metering and Baking:

The baking mixture is metered into heated, divided baking molds or heated drums (wafer rolls) and baked at temperatures between 140° C. and 230° C. to a residual water content of a few percent by weight, preferably less than 3% by weight. The baking time, depending on product and baking temperature, is generally between 40 seconds and 3 minutes.

Demolding and Reshaping:

The hot baked product leaves the baking mold as a planar endless belt (wafer rolls) or as a planar piece and is immediately, in a molding tool, in the still hot state, or at any rate in the reheated state, brought into a shape for instance by wrapping, rolling, deep-drawing, pressing, embossing, stamping, bending, folding, which shape is fixed on a subsequent short cooling section by solidifying the plasticizing sugar content, if plastic deformability is not caused again by becoming moist or more intense heating.

The surprisingly strong plasticizing action of erythritol and/or xylitol, in the case of complete replacement of sugar(s), is accompanied by a reduction in the required amount used to about half to one third of the sugar otherwise required.

Currently, it can only be assumed that these polyols are particularly efficient plasticizers for starch and protein. This may also be assumed because the viscosity of the baking mixtures does not increase, but even shows a slight tendency to decrease, despite the replacement of sugar by erythritol or xylitol concentrations which are lower by a factor of 2-3. Baking mixtures having a sucrose content reduced in such a manner, in contrast, are more highly viscous.

In the case of erythritol as a sugar substitute, the reduced amount used is associated with complete disappearance of the sweet taste, and in the case of xylitol with a very strong reduction. Only partial replacement of sugar(s) with a correspondingly lower erythritol or xylitol quantity is also possible.

To produce products which have the same sweetness but are completely sugar-free—containing erythritol or xylitol instead of sugar—combination with known sugar substitutes or sweeteners is required in the formula.

By using erythritol, reshapeable non-perishable baked goods can now be produced which are also significantly reduced in metabolically available energy. Erythritol can thus act as a low-calorie filler.

Non-perishable baked goods containing erythritol and/or xylitol are, in addition, suitable as diet products with respect of suitability for diabetics and non- or anticariogenic action.

In addition, in the case of exclusive use of starches, purely white, reshapeable baking-wafer-disc-like wafer products, cones, rolled wafers, deep-drawn or stamped pieces, etc.

can now also be produced or, containing corresponding color additives, articles can be fabricated in various colors not impaired by the conventional brown notes of the caramelized sugar.

The reshapeable flat or strip-like wafer pieces are, before or immediately after reshaping, accessible to impregnation or coating, by which, for instance, their permeation behavior or sealing behavior can be modified or their taste modified.

In addition, the use of erythritol and/or xylitol at concentrations of only a few percent (based on flours and/or starches) likewise gives advantages for the production, since the degree of sweetness of the product can be specifically reduced.

In addition, by means of the better plasticizing action, the water concentration required for a defined viscosity can be reduced. As a result, with increasing concentration of the polyols, less energy is therefore consumed, the baking time required is decreased and thus the output is increased.

The quantities given in the examples hereinafter are parts by weight.

EXAMPLE 1

Production of Wafer Rolls with Partial and Complete Sugar Replacement

Dimensions: 9 mm in Diameter, 90 mm Long

A machine type EWB (Franz Haas Waffelmaschinen Industrie AG, Vienna, Austria) was used. Wafer rolls of this type have been customarily produced having a sugar level in the range from 50 to over 100% by weight (on the basis of flours and/or starches), preferably 60-80% by weight and therefore have an intensively sweet taste, as illustrated by prior art composition of formula No. 1. Formulas 2-8 illustrate the present invention.

| Formula No. | 1 | 2 | 3 | 4 | 5 | 6 | 7 | 8 |
|---|---|---|---|---|---|---|---|---|
| Water | 130 | 125 | 120 | 120 | 120 | 120 | 115 | 110 |
| Wheat flour[1] | 100 | 100 | 100 | 100 | 100 | 100 | 100 | 100 |
| Starch | 10 | 10 | 5 | 5 | 0 | 5 | — | — |
| Sucrose | 70 | 45 | 30 | 20 | — | — | — | — |
| Erythritol[2] | — | 5 | 12 | 18 | 23 | 10 | 26 | 50 |
| Xylitol[3] | — | — | — | — | — | 20 | — | — |
| Milk powder | 5 | 5 | 5 | 5 | 5 | 5 | 5 | 5 |
| Baking powder[4] | 0.5 | 0.5 | 0.5 | 0.5 | 0.5 | 0.5 | 1 | 1 |
| Oil lecithin 5/2 | 0.7 | 0.7 | 0.7 | 0.7 | 0.7 | 0.7 | 0.7 | 0.7 |
| Rollability | yes | yes | yes | yes | yes[a] | yes | yes | yes[b] |
| Sticking | no | no | no | no | no | no | no | no |
| Too soft | no | no | no | no | no | no | no | no[c] |
| Comments | comp | | | | | | | |

[1]Type 550, Vonwiller, Schwechat, Austria
[2]Cerestar, Vilvoorde, Belgium
[3]Roquette, Lille, France
[4]Molda 55, Molkerei Dahlenburg AG, Germany
[a]impaired rollability
[b]tears easily
[c]soft strip
comp = comparison The products made with the sugar completely replaced by, for example, 26% by weight of erythritol instead of sugar taste neutral, not sweet and have a rounded flavor typical of cereals. No rapid oversaturation of taste occurs. The filling with non-sweet confectionery cremes gives an attractive product with a rounded flavor.

EXAMPLE 2

Production of Wafer Rolls with Partial and Complete Sugar Replacement

Dimensions; 9 mm in Diameter, 90 mm Long

A machine type EWB (Franz Haas Waffelmaschinen Industrie AG, Vienna, Austria) was used. Wafer rolls of this type have been customarily produced having a sugar addition in the range from 50 to over 100% by weight (on the basis of flours and/or starches), preferably 60-80% by weight and therefore have an intensively sweet taste, as illustrated by formula No. 1 above. Formulas 9-16 illustrate the present invention.

| Formula No. | 9 | 10 | 11 | 12 | 13 | 14 | 15 | 16 |
|---|---|---|---|---|---|---|---|---|
| Water | 130 | 125 | 120 | 120 | 120 | 120 | 115 | 110 |
| Wheat flour[1] | 100 | 100 | 100 | 100 | 100 | 100 | 100 | 100 |
| Starch | 10 | 10 | 5 | 5 | 0 | 5 | — | — |
| Sucrose | 10 | 45 | 30 | 20 | — | — | — | — |
| Erythritol[2] | 10 | — | — | — | — | 15 | — | — |
| Xylitol[3] | 10 | 5 | 12 | 18 | 23 | 15 | 26 | 50 |
| Milk powder | 5 | 5 | 5 | 5 | 5 | 5 | 5 | 5 |
| Baking powder[4] | 0.5 | 0.5 | 0.5 | 0.5 | 0.5 | 0.5 | 1 | 1 |
| Oil/lecithin 5/2 | 0.7 | 0.7 | 0.7 | 0.7 | 0.7 | 0.7 | 0.7 | 0.7 |
| Rollability | yes | yes | yes | yes | yes[a] | yes | yes | yes[b] |
| Sticking | no | no | no | no | no | no | no | no |
| Too soft | no | no | no | no | no | no | no | no[c] |
| Comments | | | | | | | | |

[1]Type 550, Vonwiller, Schwechat, Austria
[2]Cerestar, Vilvoorde, Belgium
[3]Roquette, Lille, France
[4]Molda 55, Molkerei Dahlenburg AG, Germany
[a]impaired rollability
[b]tears easily
[c]soft strip The products made with the sugar completely replaced by, for example, 26% by weight of xylitol instead of sugar taste less sweet and have a rounded flavor typical of cereals. No rapid oversaturation of taste occurs. The filling with non-sweet confectionery cremes gives an attractive product with a rounded flavor.

EXAMPLE 3

Production of Rolled Sugar Cones with Partial and Complete Replacement of Sugar

Baking molds of type TRO (Franz Haas Waffelmaschinen Industrie AG, Vienna, Austria) are used. The product has the cone shape flat-top, 65 mm long, diameter 28 mm. Such rolled cones customarily have required an addition of sugar of greater than 30 up to 50% by weight (based on flours and/or starches), preferably from 35 to 45% by weight and therefore taste markedly sweet, as illustrated by comparison formula No. 17. Formulas 18-19 and 21-24 illustrate the present invention. Formula 20 is a comparison formula with insufficient polyol, and cannot be rolled.

| Formula No. | 17 | 18 | 19 | 20 | 21 | 22 | 23 | 24 |
|---|---|---|---|---|---|---|---|---|
| Water | 120 | 120 | 120 | 120 | 115 | 115 | 115 | 110 |
| Wheat flour[1] | 100 | 100 | 100 | 100 | 100 | 100 | 100 | 100 |
| Starch | 10 | 10 | 10 | 10 | 10 | 5 | 10 | 10 |
| Sucrose | 40 | 35 | 20 | — | — | — | — | — |
| Erythritol[2] | — | 3 | 10 | 10 | 10 | 13.6 | 20 | 30 |
| Xylitol[3] | — | — | — | — | 10 | — | — | — |
| Sodium bicarbonate | 0.25 | 0.25 | 0.25 | 0.25 | 0.25 | 0.25 | 0.25 | 0.25 |
| Lecithin | 1.8 | 1.8 | 1.8 | 1.8 | 1.8 | 1.8 | 1.8 | 1.8 |
| Fat | 3 | 3 | 3 | 3 | 3 | 3 | 3 | 3 |
| Rollability | yes | yes | yes | no | yes | yes[a] | yes | yes[b] |
| Sticking | no | no | no | no | no | no | no | no |
| Too soft | no | no | no | no | no | no | no | no[c] |
| Comments | comp. | | | comp. | | | | |

[1]Type 550, Vonwiller, Schwechat, Austria
[2]Cerestar, Vilvoorde, Belgium
[3]Roguette, Lille, France
[a]impaired rollability
[b]very elastic
[c]soft wafer piece
comp = comparison Corresponding products with the sugar completely replaced by, for example, 20% by weight of erythritol instead of sugar taste neutral, not sweet and have a rounded flavor typical of cereals. No rapid oversaturation of taste occurs. The filling with non-sweet confectionery cremes gives an attractive product with a rounded flavor.

EXAMPLE 4

Production of Rolled Sugar Cones with Partial and Complete Replacement of Sugar

Baking molds of type TRO (Franz Haas Waffelmaschinen Industrie AG, Vienna, Austria) are used. The product has the cone shape flat-top, 65 mm long, diameter 28 mm. Such rolled cones customarily have required a level of sugar of greater than 30 up to 50% by weight (based on flours and/or starches), preferably from 35 to 45% by weight and therefore taste markedly sweet, as illustrated by comparison formula No. 17 above. Formulas 25-27 and 29-32 illustrate the present invention. Formula 28 is a comparison formula with insufficient polyol and cannot be rolled.

| Formula No. | 25 | 26 | 27 | 28 | 29 | 30 | 31 | 32 |
|---|---|---|---|---|---|---|---|---|
| Water | 85 | 120 | 120 | 120 | 85 | 115 | 115 | 110 |
| Wheat flour[1] | 0 | 100 | 100 | 100 | 0 | 100 | 100 | 100 |
| Starch | 100 | 10 | 10 | 10 | 100 | 5 | 10 | 10 |
| Sucrose | — | 35 | 20 | — | — | — | — | — |
| Erythritol[2] | 20 | — | — | — | — | — | — | — |
| Xylitol[3] | — | 3 | 10 | 10 | 20 | 13.6 | 20 | 30 |
| Sodium bicarbonate | 0.25 | 0.25 | 0.25 | 0.25 | 0.25 | 0.25 | 0.25 | 0.25 |
| Lecithin | 1.8 | 1.8 | 1.8 | 1.8 | 1.8 | 1.8 | 1.8 | 1.8 |
| Fat | 3 | 3 | 3 | 3 | 3 | 3 | 3 | 3 |
| Rollability | yes | yes | yes | no | yes | yes[a] | yes | yes[b] |
| Sticking | no | no | no | no | no | no | no | no |
| Too soft | no | no | no | no | no | no | no | no[c] |
| Comments | white | | | Comp. | white | | | |

[1]Type 550, Vonwiller, Schwechat, Austria
[2]Cerestar, Vilvoorde, Belgium
[3]Roquette, Lille, France
[a]impaired rollability
[b]very elastic
[c]soft wafer piece
comp. = comparison Corresponding products with the sugar completely replaced by, for example, 20% by weight of xylitol instead of sugar taste neutral, virtually not sweet and have a rounded flavor typical of cereals. No rapid oversaturation of taste occurs. The filling with non-sweet confectionery cremes gives an attractive product with a rounded flavor.

EXAMPLE 5

Production of Rolled Wafers with Partial and Complete Replacement of Sugar

Baking molds of type WRO (Franz Haas Waffelmaschinen Industrie AG, Vienna, Austria) are used. The rolled wafers are approximately 20 mm in diameter and are 45 mm long. These have customarily required a level of sugar of from greater than 35 up to 60% by weight (based on flours and/or starches), preferably from 40 to 50% by weight and therefore taste markedly sweet, as illustrated by comparison formula No. 33. Formulas 34-40 illustrate the present invention.

| Formula No. | 33 | 34 | 35 | 36 | 37 | 38 | 39 | 40 |
|---|---|---|---|---|---|---|---|---|
| Water | 140 | 120 | 120 | 120 | 120 | 115 | 85 | 110 |
| Wheat flour[1] | 100 | 100 | 100 | 100 | 100 | 100 | 0 | 100 |
| Starch | 25 | 10 | 10 | 10 | 10 | 5 | 100 | 10 |
| Sucrose | 50 | 25 | — | — | — | — | — | — |
| Erythritol[2] | — | 12 | 16 | 23 | — | — | 25 | 33 |
| Xylitol[3] | — | — | — | — | 16 | 23 | — | — |
| Sodium bicarbonate | 0.2 | 0.2 | 0.2 | 0.2 | 0.2 | 0.2 | — | 0.2 |
| Baking powder[4] | 2.5 | 2.5 | 2.5 | 2.5 | 2.5 | 2.5 | — | 2.5 |
| Malt extract[5] | 4 | 4 | 4 | 4 | 4 | 4 | — | 4 |
| Lecithin | 1 | 1 | 1 | 1 | 1 | 1 | 0.5 | 1 |
| Fat | 8 | 8 | 8 | 8 | 8 | 8 | 2.5 | 8 |
| Rollability | yes | yes | yes[a] | yes | yes[a] | yes | yes | yes[b] |
| Sticking | no | no | no | no | no | no | no | no |
| Too soft | no | no | no | no | no | no | no | no |
| Comments | comp. | | | | | | | white |

[1]Type 550, Vonwiller, Schwechat, Austria
[2]Cerestar, Vilvoorde, Belgium
[3]Roquette, Lille, France
[4]Molda 55, Molkerei Dahlenburg AG, Germany
[5]Liquid malt extract, STAMAG, Vienna, Austria
[a]impaired rollability
[b]very elastic
[c]soft wafer piece
comp. = comparison Corresponding products with the sugar completely replaced by, for example, 23% by weight of erythritol or xylitol instead of sugar taste neutral, not sweet and have a rounded flavor typical of cereals. No rapid oversaturation of taste occurs.

EXAMPLE 6

Production of Deep-Drawn, Cup-Shaped Hollow Bodies with Partial and Complete Replacement of Sugar in a pilot-plant facility. The products are approximately 65 mm in diameter and are approximately 80 mm high. These customarily have required a level of sugar of from greater than 40 up to 80% by weight (based on flours and/or starches), preferably from 45 to 65% by weight and therefore taste intensively sweet, as illustrated by comparison formula No. 41. Formulas 42-48 illustrate the present invention.

| Formula No. | 41 | 42 | 43 | 44 | 45 | 46 | 47 | 48 |
|---|---|---|---|---|---|---|---|---|
| Water | 110 | 100 | 100 | 95 | 100 | 95 | 85 | 90 |
| Wheat flour[1] | 100 | 100 | 100 | 100 | 100 | 100 | 0 | 100 |
| Starch | 5 | 5 | 5 | 5 | 5 | 5 | 100 | 5 |
| Sucrose | 60 | 28 | — | — | — | — | — | — |
| Erythritol[2] | — | 10 | 18 | 26 | — | — | 25 | 32 |
| Xylitol[3] | — | — | — | — | 18 | 26 | — | — |
| Sodium bicarbonate | 0.2 | 0.2 | 0.2 | 0.2 | 0.2 | 0.2 | — | 0.2 |
| Baking powder[4] | 1 | 1 | 1 | 1 | 1 | 1 | — | 1 |
| Lecithin | 1 | 1 | 1 | 1 | 1 | 1 | 0.5 | 1 |
| Fat | 6 | 6 | 6 | 6 | 6 | 6 | 2.5 | 6 |
| Rollability | yes | yes | yes[a] | yes | yes[a] | yes | yes | yes |
| Sticking | no | no | no | no | no | no | no | no |
| Too soft | no | no | no | no | no | no | no | no[b] |
| Comments | comp. | | | | | | white | |

[1]Type 550, Vonwiller, Schwechat, Austria
[2]Cerestar, Vilvoorde, Belgium
[3]Roquette, Lille, France
[4]Molda 55, Molkerei Dahlenburg AG, Germany
[a]impaired reshapeability
[b]soft wafer piece, readily reshapeable
comp. = comparison Corresponding products having the sugar completely replaced by, for example, 26% by weight of erythritol or xylitol instead of sugar taste neutral, not sweet and have a rounded flavor typical of cereals. No rapid oversaturation of taste occurs.

We claim:

1. A baking mixture for baking non-perishable baked goods, comprising flours and/or starches, the proportion of flours and/or starches being at least 63.8 percent by weight of said mixture excluding water, and a plasticizing agent selected from the group consisting of erythritol, xylitol, and mixtures of erythritol and xylitol in the range of 12 to 55% by weight based on the total of flour and starch, wherein said baked goods are heat-deformable when hot and maintain a heat-deformed shape when said baked goods are cooled.

2. The baking mixture according to claim 1, wherein said articles are mechanically deformed into rolls and solidified to wafer rolls, and the amount of erythritol and/or xylitol is in the range from 15-55% by weight, based on the total of flour and starch.

3. The baking mixture according to claim 1, wherein said articles are mechanically deformed into rolled cones and solidified to rolled wafer cones, and the amount of erythritol and/or xylitol is in the range from 12 to 35% by weight, based on the total of flour and starch.

4. The baking mixture according to claim 1, wherein said articles are mechanically deformed into deep-drawn shaped bodies and solidified to deep-drawn shaped bodies, and the amount of erythritol and/or xylitol is in the range from 15 to 55% by weight, based on the total of flour and starch.

5. The baking mixture according to claim 1, wherein the baking mixture is free of sugar and the plasticizing amount of erythritol and/or xylitol is in the range from 12 to 55% by weight, based on the total of flour and starch.

6. The baking mixture according to claim 5, wherein the baking mixture is baked to hot heat-deformable baked articles being mechanically deformed in their hot plastic state and solidified in the obtained shape when cooling to the baked goods.

7. The baking mixture according to claim 6, wherein said articles are mechanically deformed into rolls and solidified to wafer rolls, and the amount of erythritol and/or xylitol is in the range from 20 to 55% by weight, based on the total of flour and starch.

8. The baking mixture according to claim 6, wherein said articles are mechanically deformed into rolled cones and solidified into rolled wafer cones, and the amount of erythritol and/or xylitol is from 12 to 35% by weight, based on the total of flour and starch.

9. The baking mixture according to claim 6, wherein said articles are mechanically deformed into deep-drawn shaped bodies and solidified into deep-drawn shaped bodies, and the amount of erythritol and/or xylitol is from 15 to 55% by weight, based on the total of flour and starch.

10. A baking mixture for baking non-perishable baked goods being heat-deformable at an elevated temperature and characterized by a brittle and crispy texture at room temperature, a glass transition temperature above room temperature, said baking mixture comprising:
   a) flours and/or starches, the proportion of flours and/or starches being at least 63.8 percent by weight of said mixture excluding water,
   b) at least one plasticizing agent selected from the group consisting of at least one aliphatic polyol having four to five carbon atoms and an alcoholic hydroxyl group linked to each carbon atom wherein the weight percent of said polyol is in the range from 12 to 55% based on the total of flour and starch, and mixtures of said at least one aliphatic polyol and sugar, wherein the quantity of sugar is in the range from 0-63.1% by weight based on the total of flour and starch, and
   (c) water in the range from 70-150% by weight based on the total of flour and starch, wherein said baked goods are heat-deformable when hot and maintain a heat-deformed shape when said baked goods are cooled.

11. The baking mixture according to claim 10, wherein the baking mixture is free of sugar.

12. The baking mixture according to claim 10, wherein said aliphatic polyol is selected from the group consisting of erythritol and xylitol.

13. The baking mixture according to claim 10, wherein the amount of sugar is in the range from 20 to 45% by weight, based on the total of flour and starch, and the amount of said polyol is in the range from 5 to 18% by weight, based on the total of flour and starch.

14. Non-perishable baked goods being heat-deformable at an elevated temperature and characterized by a brittle and crispy texture at room temperature, said baked goods comprising:
   (a) flours and/or starches, the proportion of flours and/or starches being at least 63.8 percent by weight of said mixture excluding water,
   (b) an effective plasticizing amount of at least one plasticizing agent selected from the group consisting of at least one aliphatic polyol having four to five carbon atoms and an alcoholic hydroxyl group linked to each carbon atom, and mixtures of said at least one aliphatic polyol and sugar, wherein the amount of said polyol is in the range from 12 to 55% by weight based on the total of flour and starch, and wherein the quantity of sugar is in the range from 0-63.1% by weight, based on the total of flour and starch, and
   (c) water in an amount not exceeding 10% by weight, based on the total of flour and starch.

15. The baked goods according to claim 14, wherein the amount of water does not exceed 3%.

16. The baked goods according to claim 14, wherein the baking mixture is free of sugar.

17. The baked goods according to claim 14, wherein said polyol is selected from the group consisting of erythritol and xylitol.

18. The baked goods according to claim 16, wherein the amount of sugar is in the range from 20 to 45% by weight based on the total of flour and starch, and the amount of said polyol is in the range from 5 to 18% by weigh based on the total of flour and starch.

19. The baked goods according to claim 16 having a neutral taste.

20. The baked goods according to claim 16 selected from the group consisting of wafer rolls, rolled wafer cones, rolled wafers, and deep-drawn shaped bodies.

21. The baked goods according to claim 14 made from starches without flour.

* * * * *